(12) United States Patent
Hwang et al.

(10) Patent No.: US 8,811,891 B2
(45) Date of Patent: Aug. 19, 2014

(54) APPARATUS AND METHOD FOR SETTING TRANSMIT POWER OF A COMPACT BASE STATION IN A WIRELESS COMMUNICATION SYSTEM

(75) Inventors: In-Seok Hwang, Seoul (KR); In-Taek Lee, Seoul (KR); Won-Kyun Suk, Suwon-si (KR); Ki-Young Han, Yongin-si (KR); June Moon, Seoul (KR); Byoung-Ha Yi, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1453 days.

(21) Appl. No.: 12/146,403

(22) Filed: Jun. 25, 2008

(65) Prior Publication Data

US 2009/0005105 A1    Jan. 1, 2009

(30) Foreign Application Priority Data

Jun. 29, 2007 (KR) .................. 10-2007-0065222
Dec. 11, 2007 (KR) .................. 10-2007-0127995

(51) Int. Cl.
*H04B 5/00* (2006.01)

(52) U.S. Cl.
USPC ........ 455/41.1; 455/41.2; 455/41.3; 455/424; 455/446; 455/447; 455/452.1

(58) Field of Classification Search
USPC .............. 455/41.1, 41.2, 41.3, 424, 446, 447, 455/452.1, 448, 453, 454
See application file for complete search history.

(56) References Cited

U.S. PATENT DOCUMENTS

| | | | |
|---|---|---|---|
| 6,188,903 B1* | 2/2001 | Gardner et al. | 455/447 |
| 6,690,944 B1* | 2/2004 | Lee et al. | 455/522 |
| 8,369,859 B2* | 2/2013 | Claussen et al. | 455/449 |
| 2001/0027106 A1* | 10/2001 | Kito | 455/453 |
| 2005/0148368 A1* | 7/2005 | Scheinert et al. | 455/561 |
| 2006/0268924 A1* | 11/2006 | Marinier et al. | 370/445 |
| 2007/0032197 A1* | 2/2007 | Esmailzadeh et al. | 455/67.11 |
| 2007/0173259 A1* | 7/2007 | Akihara | 455/446 |
| 2007/0184869 A1* | 8/2007 | Koo et al. | 455/522 |
| 2007/0191051 A1* | 8/2007 | Suonvieri | 455/522 |
| 2007/0287501 A1* | 12/2007 | Hoshina et al. | 455/562.1 |
| 2008/0130593 A1* | 6/2008 | Scheinert et al. | 370/337 |
| 2009/0023466 A1 | 1/2009 | Sutivong et al. | |

FOREIGN PATENT DOCUMENTS

| | | | |
|---|---|---|---|
| KR | 10-2006-0091938 A | 8/2006 | |
| KR | 10-2006-0098720 A | 9/2006 | |
| KR | 10-0651407 B1 | 11/2006 | |
| KR | 10-2007-0032335 A | 3/2007 | |

* cited by examiner

*Primary Examiner* — Wen Huang
(74) *Attorney, Agent, or Firm* — Jefferson IP Law, LLP (57) ABSTRACT

An apparatus and method for setting transmit power of a compact Base Station (BS) in a wireless communication system are provided. In the apparatus and method a measurer measures a signal strength corresponding to each of one or more neighbor BSs while operating in a Mobile Station (MS) mode, a receiver receives a signal strength corresponding to each of the one or more neighbor BSs measured by one or more MSs from the corresponding one or more MSs, and a self-configuration controller sets a target signal strength based on the signal strength corresponding to each of the one or more neighbor BSs measured in the MS mode and controls a transmit power so that the signal strength corresponding to each of the one or more neighbor BSs measured by the one or more MSs substantially reaches the target signal strength.

34 Claims, 4 Drawing Sheets

APPARATUS AND METHOD FOR SETTING TRANSMIT POWER OF A COMPACT BASE STATION IN A WIRELESS COMMUNICATION SYSTEM

PRIORITY

This application claims the benefit under 35 U.S.C. §119 (a) of a Korean patent application filed in the Korean Intellectual Property Office on Jun. 29, 2007 and assigned Serial No. 2007-65222, and of a Korean patent application filed in the Korean Intellectual Property Office on Dec. 11, 2007 and assigned Serial No. 2007-127995, the entire disclosures of each of which are hereby incorporated by reference.

BACKGROUND OF THE INVENTION

1. Field of the Invention The present invention generally relates to a compact Base Station (BS). More particularly, the present invention relates to an apparatus and method for setting the transmit power of a compact BS in a broadband wireless communication system.

2. Description of the Related Art

A BS in a cellular broadband wireless communication system communicates with Mobile Stations (MSs) within its cell area via radio channels. The statuses of the radio channels vary with the movement of the MSs. If an MS is located in a physically shielded area, for example, in a propagation shadow area such as an office or a house, the channel status between the MS and a BS is very poor, thus making it difficult to establish and maintain reliable communications between them. Installation of a compact BS serving as a BS in a shadow area such as an office or a house is under consideration as a way to address this problem.

A compact BS is useful in the following two exemplary cases. The first exemplary case is where users cannot receive a service from an outdoor macro BS installed by a service provider due to signal attenuation caused by the walls of a building or obstacles. The second case is where a user installs a personal BS within a house or an office in order to reduce costs.

Compared to a high-power BS installed by the service provider, the compact BS should adaptively control its transmit power according to the propagation environment of its location. A constraint on the transmit power of the compact BS is that an acceptable data rate should be provided to its users, while minimizing effects on the legacy system. In addition, handover to and from an external BS should be available within an allowed transmit power of the compact BS.

A Code Division Multiple Access (CDMA) compact BS for home use, referred to as a Ubicell, adopts a power ranging scheme that increases its transmit power until a foreign user is detected. Device Identifiers (IDs) of users such as Media Access Control (MAC) IDs or Electronic Serial Numbers (ESNs) are registered to the compact BS and the compact BS controls its output level by increasing its transmit power until an initial access or a handover from an unregistered user is detected.

This conventional technology is based on the premise that the compact BS has full knowledge of its registered users. If the compact BS is installed for home use, its implementation is not challenging because there would only be a small number of registered users. On the other hand, in a large building, the compact BS is harder to implement due to there being a large number of registered users. What is worse, when a foreign user moves close to the building, the compact BS should operate without changing its transmit power and should consider the movement of the foreign user to be an exceptional situation. That is, the compact BS should determine whether an access from a foreign user has been triggered by his movement into the area serviced by the compact BS or a result of an excessive transmit power of the compact BS.

As described above, registration of users to the compact BS is required in order to control the transmit power of the compact BS based upon a detection of an access (or handover) of a foreign user, and the inability to accurately determine whether the foreign user has moved into the area serviced by the compact BS. As a consequence, it is difficult to implement the compact BS.

SUMMARY OF THE INVENTION

An aspect of the present invention is to address at least the above-mentioned problems and/or disadvantages and to provide at least the advantages described below. Accordingly, an aspect of the present invention is to provide an apparatus and method for efficiently setting a transmit power in a compact BS in a wireless communication system.

Another aspect of the present invention is to provide an apparatus and method for setting a transmit power based on the signal strengths of neighbor BSs reported by MSs being serviced by a compact BS in a wireless communication system.

A further aspect of the present invention is to provide an apparatus and method for setting a transmit power by comparing the signal strengths of neighbor BSs measured in a MS mode with the signal strengths of the neighbor BSs reported by MSs serviced by a compact BS in a wireless communication system.

Still another aspect of the present invention is to provide an apparatus and method for setting a target signal strength using the signal strengths of neighbor BSs measured in a MS mode and adjusting a transmit power so that the signal strengths of the neighbor BSs reported by MSs reaches the target signal strength at a compact BS in a wireless communication system.

Yet another aspect of the present invention is to provide an apparatus and method for estimating and compensating for shadowing in a compact BS in a wireless communication system.

Yet still another aspect of the present invention is to provide an apparatus and method for defining a power rise value as the difference between the average of the signal strengths of a compact BS measured by MSs and the average of the signal strengths of an external BS measured by the same MSs and adjusting the transmit power of the compact BS so that the power rise value reaches a target power rise value in the compact BS in a wireless communication system.

In accordance with an aspect of the present invention, a compact BS in a wireless communication system is provided. In the compact BS, a measurer measures a signal strength corresponding to each of one or more neighbor BSs while operating in a Mobile Station (MS) mode, a receiver receives a signal strength corresponding to each of the one or more neighbor BSs measured by one or more MSs from the corresponding one or more MSs, and a self-configuration controller sets a target signal strength based on the signal strength corresponding to each of the one or more neighbor BSs measured in the MS mode and controls a transmit power so that the signal strength corresponding to each of the one or more neighbor BSs measured by the one or more MSs substantially reaches the target signal strength.

In accordance with another aspect of the present invention, a method for setting a transmit power in a compact BS in a wireless communication system is provided. In the method, a signal strength corresponding to one or more neighbor BSs are measured while operating in a MS mode, a signal strength corresponding to one or more neighbor BSs are measured by one or more MSs and are received from the corresponding one or more MSs, after transitioning to a normal mode, a target signal strength is set based on the signal strength corresponding to each of the one or more neighbor BSs measured in the MS mode, and a transmit power is controlled so that the signal strength corresponding to each of one or more the neighbor BSs measured by the one or more MSs substantially reaches the target signal strength.

In accordance with a further aspect of the present invention, a compact BS in a wireless communication system is provided. In the compact BS, a measurer measures a signal strength corresponding to each of one or more BSs and a thermal noise while operating in a MS mode, a receiver receives a signal strength of each of the compact BS and the one or more BSs measured by one or more MSs from the corresponding one or more MSs, and a self-configuration controller calculates a first average by averaging the signal strength of the compact BS received from the one or more MSs, calculates a second average corresponding to an average noise of the one or more MSs based on the signal strength corresponding to each of the one or more BSs measured in the MS mode, determines the difference between the first and second averages to be a power rise, and controls the transmit power by comparing the power rise with a target power rise.

In accordance with still another aspect of the present invention, an operation method in a compact BS in a wireless communication system is provided. In the method, a signal strength corresponding to each of one or more BSs and a thermal noise are measured while operating in an MS mode, a signal strength of each of the compact BS and the one or more BSs measured by one or more MSs are received from the corresponding one or more MSs, a first average is calculated by averaging the signal strength of the compact BS received from the one or more MSs, a second average corresponding to an average noise of the one or more MSs is calculated based on the signal strength corresponding to each of the one or more BSs measured in the MS mode, the difference between the first and second averages is determined to be a power rise, and a transmit power is controlled by comparing the power rise with a target power rise.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a technique for adaptively setting a transmit power by a compact BS in a wireless communication system.

The following description is made with the wireless communication system being an Orthogonal Frequency Division Multiplexing (OFDM) or Orthogonal Frequency Division Multiple Access (OFDMA) communication system as an example. Exemplary embodiments of present invention are equally applicable to other wireless communication systems. Moreover, while the following description is made in the context of a broadband wireless access communication system using multiple carriers, this is merely an exemplary application. Exemplary embodiments of the present invention are equally applicable to any other application in which a wireless communication system uses a compact BS.

A compact BS may be defined as a low-power BS. Further, a compact BS may be a low-power BS that a user personally installs. A compact BS may otherwise be referred to as, for example, a micro BS, a self-configurable BS, an indoor BS, a home BS, a femto BS, or a Ubicell BS.

Figure 1:
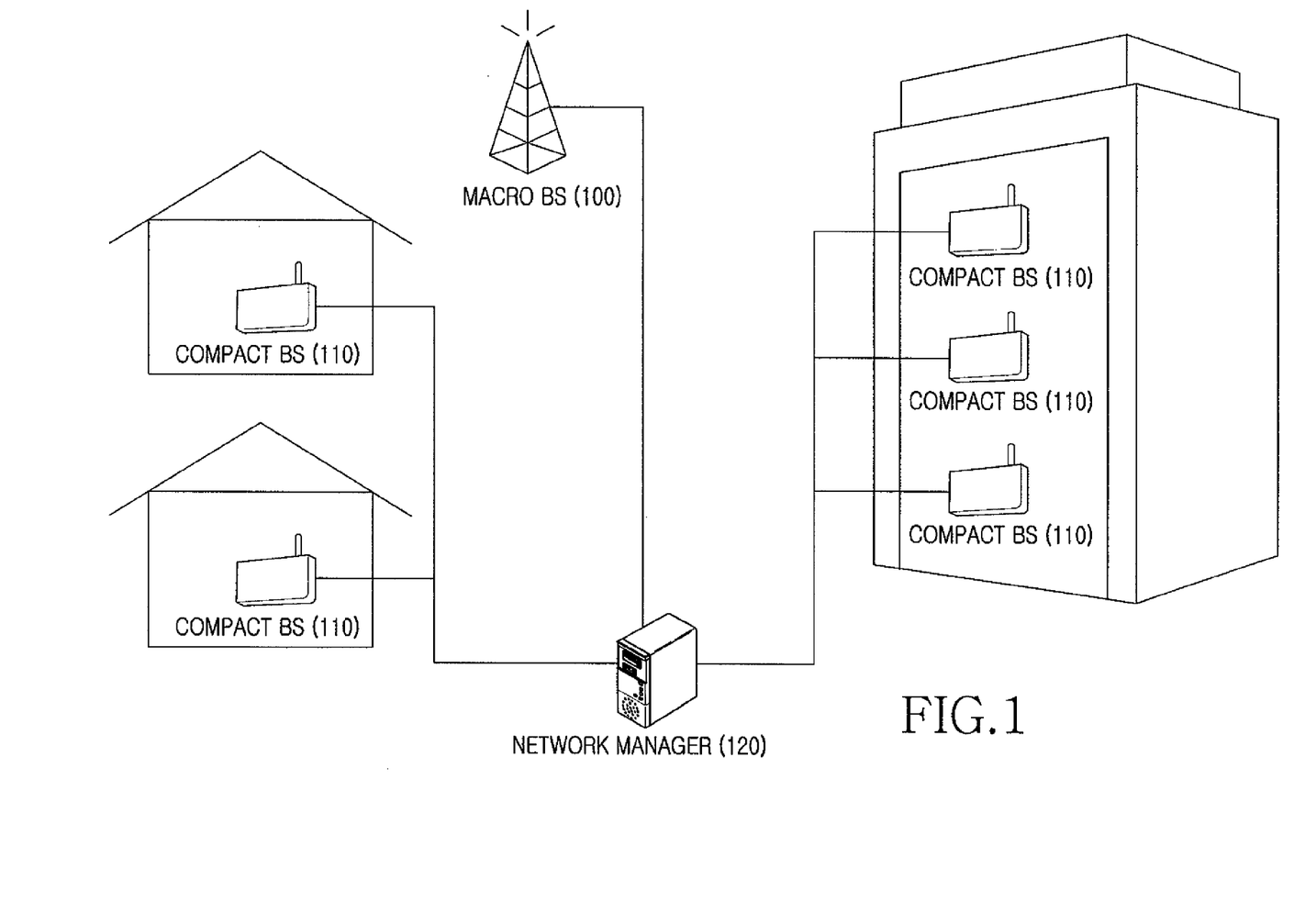
FIG. 1 illustrates a configuration of a broadband wireless communication system according to an exemplary embodiment of the present invention.

FIG. 1 illustrates a configuration of a wireless communication system using compact BSs according to an exemplary embodiment of the present invention.

Referring to FIG. 1, the wireless communication system includes a macro BS 100, compact BSs 110, and a network manager 120. The macro BS 100 is a conventional high-power BS which, in this example, is installed outdoors. The compact BSs 110 are micro BSs with low power which, in this example, are installed indoors. The compact BSs 110 may also be self-configurable BSs that autonomously optimize operational parameters when they are plugged in. For the optimization, the compact BSs 110 measure their ambient states (e.g. propagation states) while in an MS mode. The operation of the compact BSs 110 as MSs when needed is called Over The Air Receiver (OTAR) mode. The network manager 120 controls the system settings including Internet Protocol (IP) settings of BSs and image download, and network optimization including monitoring and management of the states of the operating BSs. The network manager 120 may be referred to as a WiBro System Manager (WSM) or an Element Management System (EMS) depending on an implementation of the system.

Figure 2:
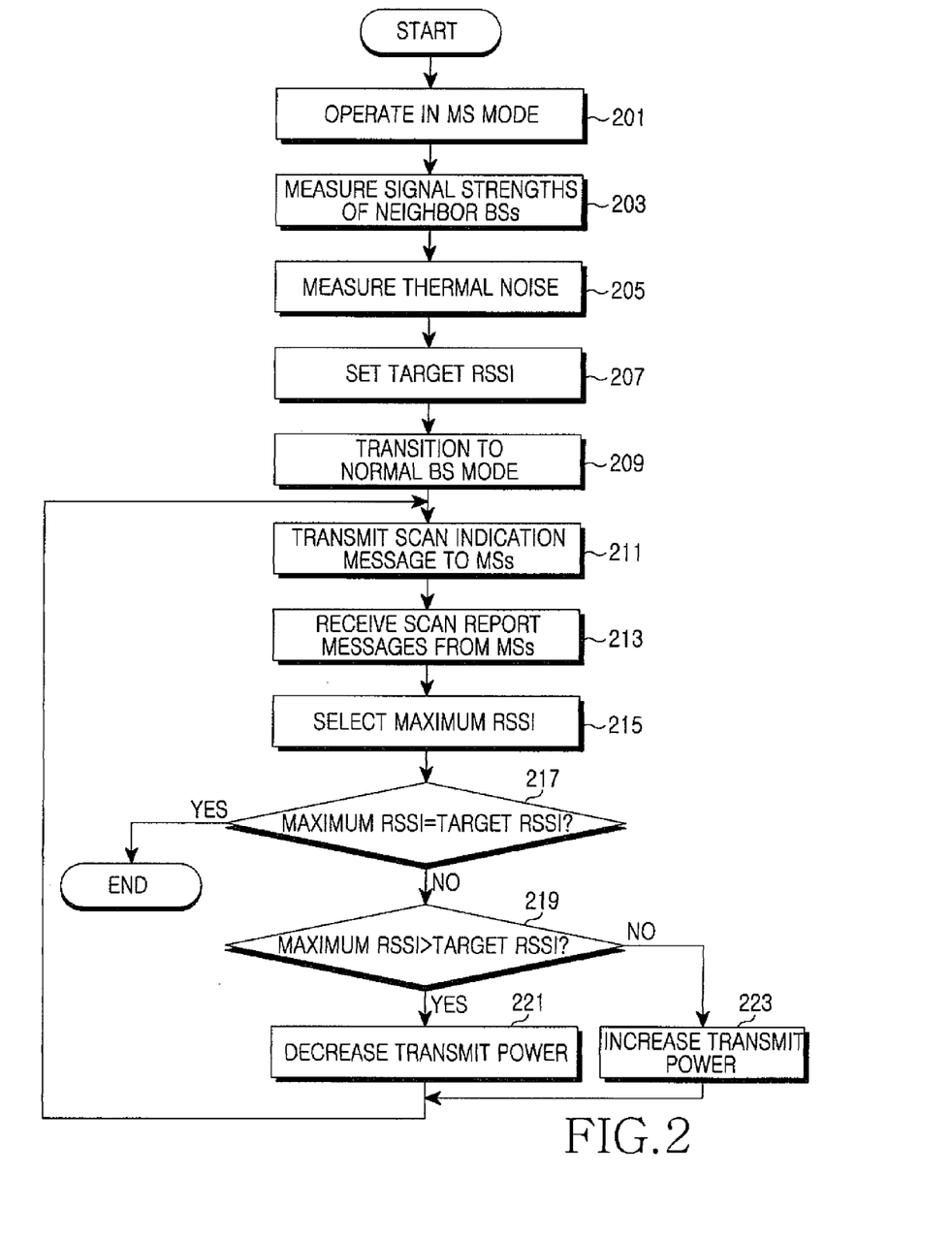
FIG. 2 is a flowchart illustrating an operation of a compact BS in a broadband wireless communication system according to an exemplary embodiment of the present invention.

FIG. 2 is a flowchart illustrating an operation of a compact BS in a broadband wireless communication system according to an exemplary embodiment of the present invention. In the exemplary algorithm described below, transmit power optimization is a self-configuration function of a compact BS.

Referring to FIG. 2, the compact BS scans neighbor BSs while in an MS mode (i.e. OTAR mode) periodically or upon generation of a preset event in step 201. While operating in the MS mode, the compact BS measures the signal strengths of the neighbor BSs in step 203 and measures a thermal noise in step 205.

In step 207, the compact BS selects the highest of the signal strengths of the neighbor BSs and the thermal noise and sets a target Received Signal Strength Indication (RSSI) by adding the selected value to a power rise. When one of the neighbor BSs has the highest signal strength, the compact BS sets the target RSSI based on the RSSI of the neighbor BS that affects the compact BS the most. When the signal strength of the thermal noise is higher than the signal strengths of any of the neighbor BSs, the target RSSI is set using the thermal noise. Thus, the target RSSI is given as target RSSI=Max(thermal noise (dB),Max.RSSIO-
TAR (dBm))+Power Rise (dB)

where Max.RSSIOTAR denotes the highest of the RSSIs of the neighbor BSs measured in the MS mode, and Power Rise denotes a value that ensures the cell coverage of the compact BS, which is optimized empirically by simulations.

After setting the target RSSI, the compact BS transitions to a normal BS mode and communicates with MSs within its coverage area in step 209. In step 211, the compact BS transmits a scan indication message (e.g. MOB_SCN-RSP) to the MSs within its coverage area. The scan indication message may include information about neighbor BSs to be scanned. If a neighbor BS uses a different frequency from that of the compact BS, the compact BS should allocate a specific scan duration for inter-Frequency Assignment (FA) scanning by the scan indication message.

The compact BS receives scan report messages (e.g. MOB_SCN-REQ) including scanning results from the MSs in step 213. The scan report messages may include IDs of neighbor BSs detected by scanning and the scanning results of the neighbor BSs (e.g. RSSIs).

In step 215, the compact BS selects the highest of the RSSIs of neighbor BSs reported by at least one MS and sets the highest value as a maximum RSSI.

The compact BS compares the maximum RSSI with the target RSSI. If the maximum RSSI is equal to the target RSSI in step 217, the compact BS ends the algorithm, since it determined that its transmit power does not need to be adjusted.

If the maximum RSSI is different from the target RSSI, the compact BS determines whether the maximum RSSI is larger than the target RSSI in step 219. If the maximum RSSI is larger than the target RSSI, the compact BS decreases the transmit power by a preset value in step 221 and returns to step 211. That is, the compact BS reduces the transmit power, since it determined that the current transmit power results in too wide of a cell coverage area.

If the target RSSI is larger than the maximum RSSI, the compact BS increases the transmit power by a preset value in step 223 and returns to step 211. That is, the compact BS increases the transmit power, since it was determined that the current transmit power does not ensure a preset cell coverage. To prevent frequent changes in transmit power, a hysteresis margin can be used when increasing or decreasing the transmit power. For example, given a margin of 1.0 dB, the transmit power can be adjusted only if the difference between the target RSSI and the maximum RSSI is 1.0 dB or higher.

Although the algorithm depicted in FIG. 2 is simple, it may cause performance degradation because it does not take into account shadowing associated with the installed position of the compact BS and shadowing associated with the positions of MSs. Therefore, another exemplary embodiment of the present invention is provided, which can compensate for the performance degradation caused by shadowing.

In accordance with the second exemplary embodiment of the present invention, the compact BS measures the signal strengths of external BSs and a thermal noise in the OTAR mode. The compact BS also calculates a power rise by monitoring the RSSIs of the external BSs reported by MSs and changes its transmit power by comparing the power rise with a target power rise. Specifically, the compact BS calculates the dB average of the RSSIs of the compact BS measured by MSs and the dB average of the RSSIs of an external BS measured by the same MSs and determines the difference between the averages to be a power rise that can be expressed as $$P_{Rise} = E_{MS}[P_{RSSI,SC-RAS,dB}] - E_{MS}[NI_{SumofMacro,dB}] \quad (1)$$

It has been empirically verified that for a coverage area of an indoor BS (i.e. the compact BS), the power rise is constant within and up to the boundary of a building the indoor BS is located within irrespective of the absolute size of the building. On the assumption that the building is non-circular, for example, rectangular and that there is a building transmission loss larger than a change in the power rise caused by an attenuation model parameter, a fixed target power rise can be determined. Based on this assumption, an exemplary embodiment of the present invention increases the transmit power of the compact BS until the power rise determined according to the MS reports reaches the target power rise.

Meanwhile, although the average of the sum of interference signals from the external BSs (i.e. macro BSs) and the thermal noise N at the right side of equation (1) can be computed using MS-reported values, values measured by the compact BS in the OTAR mode can be substituted for the MS-reported values, after approximation, in a real world implementation. The approximation is possible when the compact BS is located within the building at approximately its center. In this case, a shadowing value with respect to the location of the compact BS should be estimated and compensated for. A compensation algorithm can be given as $$E_{MS}[NI_{SumofMacro,dB}] \approx \quad (2)$$

$$10\log_{10}\left(NF_{MS} \cdot N_o W + \sum_{j \in Macro} P_{Tx,j} \cdot S_{BS,j} \cdot PL_j\right)_{SC-RASLocation}$$

$$\left(NF_{MS} \cdot N_o W + \sum_{j \in Macro} P_{Tx,j} \cdot S_{BS,j} \cdot PL_j\right)_{SC-RASLocation} =$$

$$BF_{MS} / NF_{BS} \cdot (N_o W)_{OTAR} +$$

$$\sum_{j \in Macro} 10^{0.1 \cdot P_{j,dB,OTAR,ShadowingCompensated}}$$

$$P_{j,dB,OTAR,ShadowingCompensated} = P_{j,OTAR,dB} - S_{SC-RAS,dB} =$$

$$P_{j,OTAR,dB} - (P_{j_0,OTAR,dB} - E_{MS}[P_{RX,j_0,dB}])$$

$$P_{j,OTAR,dB} = P_{TX,j} \cdot S_{BS,j} \cdot PL_j \cdot S_{SC-RAS}$$

$$S_{SC-RAS,dB} = P_{j,OTAR,dB} - E_{MS}[P_{RX,j_0,dB}]$$

$$E_{MS}[P_{RX,j_0,dB}] = E_{MS}[10\log_{10}(P_{TX,j_0} \cdot S_{BS,j_0} \cdot PL_{j_0} \cdot S_{MS})] \rightarrow$$

$$10\log_{10}(P_{TX,j_0} \cdot S_{BS,j_0} \cdot PL_{j_0})$$

where $NF_{MS}$ denotes a noise figure of an MS, $NF_{BS}$ denotes a noise figure of a BS, $N_o$ denotes a noise spectral density, W denotes a bandwidth, j denotes the index of a macro BS, $S_{BS,j}$ denotes a shadowing of a $j^{th}$ macro BS, $PL_j$ denotes a path loss from the $j^{th}$ macro BS to the compact BS, $P_{TX,j}$ denotes the transmit power of the $j^{th}$ macro BS, and $S_{MS}$ denotes shadowing of an MS.

$$E_{MS}[NI_{SumofMacro,dB}] \approx$$
$$10\log_{10}\left(NF_{MS} \cdot N_o W + \sum_{j \in Macro} P_{Tx,j} \cdot S_{BS,j} \cdot PL_j\right)_{SC-RASLocation}$$

represents the sum of noise and interference at the location of the compact BS. The compact BS can estimate a noise power in the OTAR mode and compensate for the shadowing of the compact BS by $$\left(NF_{MS} \cdot N_o W + \sum_{j \in Macro} P_{Tx,j} \cdot S_{BS,j} \cdot PL_j\right)_{SC-RASLocation} =$$
$$BF_{MS}/NF_{BS} \cdot (N_o W)_{OTAR} + \sum_{j \in Macro} 10^{0.1 \cdot P_{j,dB,OTAR,ShadowingCompensated}}.$$

The shadowing compensation is expressed as $$P_{j,dB,OTAR,ShadowingCompensated} = P_{j,OTAR,dB} - S_{SC-RAS,dB}$$
$$= P_{j,OTAR,dB} - (P_{j_0,OTAR,dB} - E_{MS}[P_{RX,j_0,dB}]).$$

That is, since the compact BS is at the center inside the building, it estimates shadowing by computing the difference in dB between the signal strength of an external BS with the highest RSSI measured in the OTAR mode and the average of the signal strengths of the external BSs reported by MSs and compensates for the shadowing using the shadowing estimate. As depicted in $$E_{MS}\lfloor P_{RX,j_0,dB} \rfloor =$$
$$E_{MS}\lfloor 10\log_{10}(P_{TX,j_0} \cdot S_{BS,j_0} \cdot PL_{j_0} \cdot S_{MS})\rfloor \rightarrow 10\log_{10}(P_{TX,j_0} \cdot S_{BS,j_0} \cdot PL_{j_0}),$$

the compact BS can eliminate the effects of shadowing at the location of each MS by averaging the RSSIs measured by the MSs in dB.

A detailed operation according to the second exemplary embodiment of the present invention will be described below.

Figure 3:
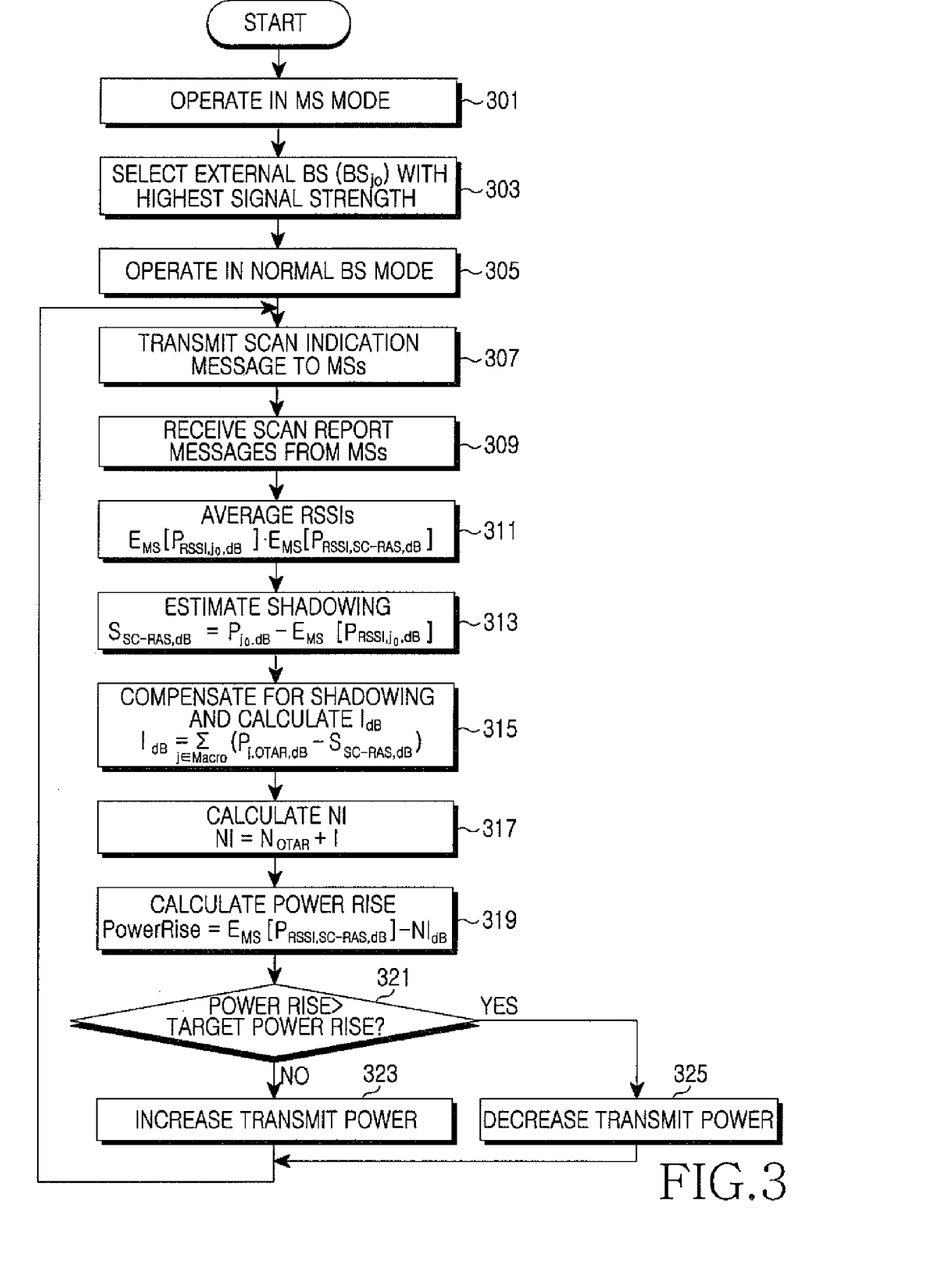
FIG. 3 is a flowchart illustrating an operation of a compact BS in a broadband wireless communication system according to another exemplary embodiment of the present invention.

FIG. 3 is a flowchart illustrating an operation of the compact BS in a broadband wireless communication system according to a second exemplary embodiment of the present invention.

Referring to FIG. 3, the compact BS scans external BSs in an MS mode (i.e. OTAR mode) periodically or upon generation of a preset event in step 301. During operating in the MS mode, the compact BS measures the signal strengths of the external BSs and measures a thermal noise.

In step 303, the compact BS selects an external BS with the highest RSSI whose index or ID is assumed to be $j_0$.

After determining the external BS that affects the compact BS the most, the compact BS transitions to a normal BS mode and communicates with MSs within its coverage area in step 305. In step 307, the compact BS transmits a scan indication message (e.g. MOB_SCN-RSP) to the MSs within its coverage area. The scan indication message may include information about at least one BS to be scanned. It is assumed herein that the compact BS requests scanning of itself, SC-RAS and the external BS $j_0$. If the external BS uses a different frequency from that of the compact BS, the compact BS should allocate a separate scan duration for inter-FA scanning by the scan indication message.

The compact BS receives scan report messages (e.g. MOB_SCN-REQ) including scanning results from the MSs in step 309. The scan report messages may include results of scanning the compact BS and the external BS $j_0$ (RSSIs).

In step 311, the compact BS calculates the dB average of the signal strengths of the compact BS reported by one or more MSs ($E_{MS}[P_{RSSI,SC-RAS,dB}]$) and calculates the dB average of the RSSIs of the external BS reported by the same one or more MSs ($E_{MS}\lfloor P_{RSSI,j_0,dB} \rfloor$). In this manner, the effects of shadowing at the location of each MS are eliminated by averaging the MS measured RSSIs in dB.

In step 313, the compact BS estimates shadowing at its location ($S_{SC-RAS,db}$) using the RSSI of the external BS $j_0$ measured in the OTAR mode and $E_{MS}\lfloor P_{RSSI,j_0,dB} \rfloor$. That is, $S_{SC-RAS,dB} = P_{j_0,dB} - E_{MS}\lfloor P_{RSSI,j_0,dB} \rfloor$.

In step 315, the compact BS compensates for the shadowing by subtracting the shadowing estimate $S_{SC-RAS,dB}$ from the signal strength $P_{j,OTAR,dB}$ of a $j^{th}$ external BS measured in the OTAR mode, and computes the sum $I_{dB}$ of interference signals by adding shadowing compensation values for all external BSs, $$I_{dB} = \sum_{j \in Macro} (P_{j,OTAR,dB} - S_{SC-RAS,dB}).$$

The compact BS calculates the sum NI of the interference sum I and the thermal noise N measured in the OTAR mode in step 317, $NI = N_{OTAR} + I$.

In step 319, the compact BS calculates a power rise by subtracting the sum $NI_{dB}$ of interference and noise from the dB average of the signal strengths of the compact BS measured by the MSs $E_{MS}[P_{RSSI,SC-RAS,dB}]$, PowerRise=$E_{MS}[P_{RSSI,SC-RAS,dB}] - NI_{dB}$.

In step 321, the compact BS compares the power rise with a target power rise. If the power rise is less than the target power rise, the compact BS increases its transmit power by a preset value in step 323 and returns to step 307. That is, the compact BS increases the transmit power, since it was determined that the current transmit power does not ensure a preset cell coverage. If the power rise is larger than the target power rise, the compact BS decreases the transmit power by a preset value in step 325 and returns to step 307. That is, the compact BS reduces the transmit power, since it was determined that the current transmit power widens the cell coverage too much.

To prevent frequency changes in transmit power, a hysteresis margin can be used when increasing or decreasing the transmit power. For example, given a margin of 1.0 dB, the transmit power can be adjusted only if the difference between the target power rise and the power rise is 1.0 dB or higher.

Figure 4:
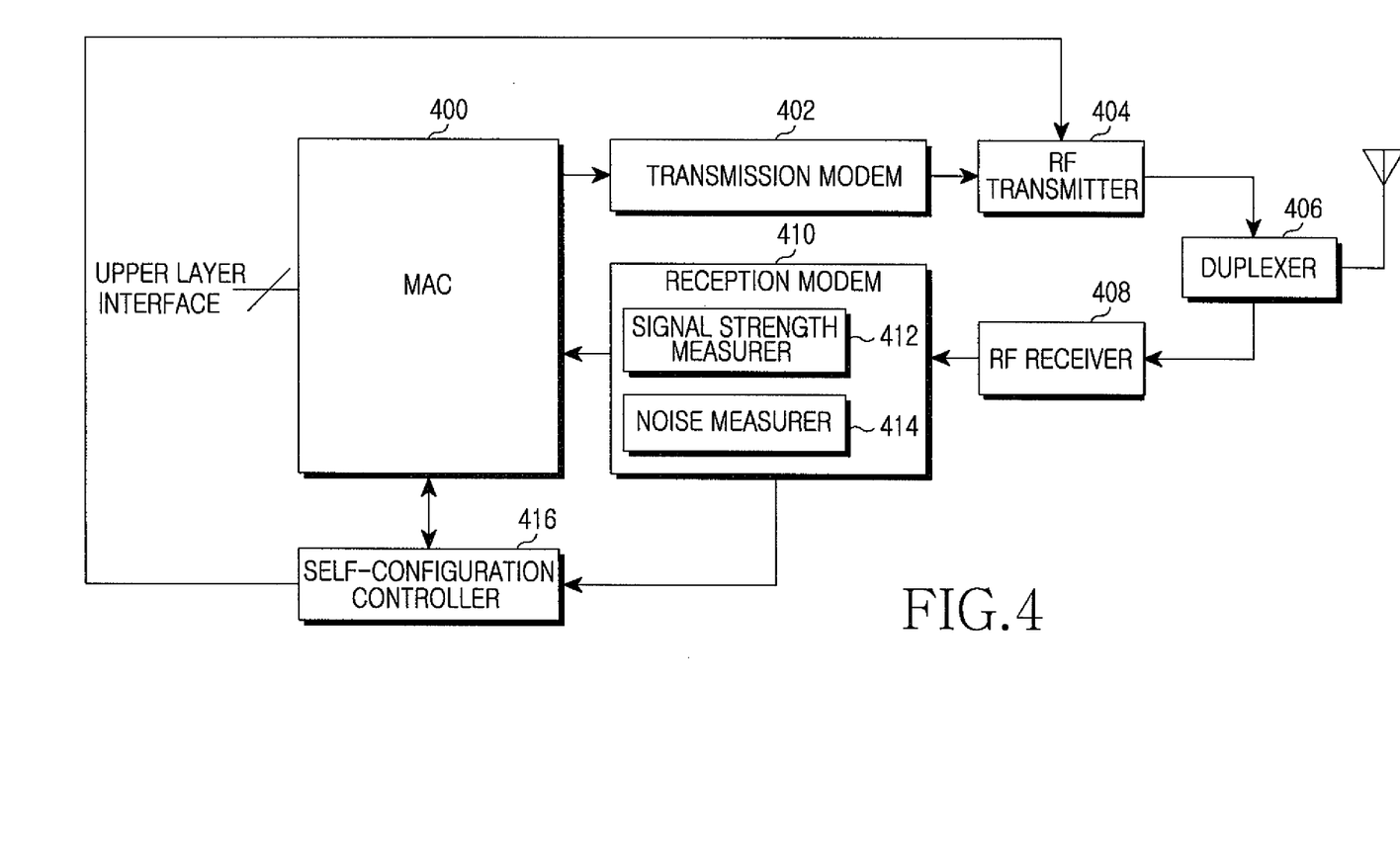
FIG. 4 is a block diagram of a compact BS in a broadband wireless communication system according to an exemplary embodiment of the present invention.

FIG. 4 is a block diagram of a compact BS in a broadband wireless communication system according to an exemplary embodiment of the present invention. While the following description is made in the context of a Time Division Duplex (TDD)-OFDMA system, it is to be clearly understood that exemplary embodiments of the present invention are equally applicable to any system that performs power control, such as a Frequency Division Duplex (FDD)-OFDMA system and a hybrid system using both TDD and FDD.

Referring to FIG. 4, the compact BS includes a MAC layer 400 connected to an upper layer via an upper layer interface, a transmission Modulator-Demodulator (MODEM) 402, a Radio Frequency (RF) transmitter 404, a duplexer 406, an RF receiver 408, a reception MODEM 410, and a self-configuration controller 416.

In operation, the MAC layer 400 receives transmission data from the upper layer (e.g. IP layer) and processes the transmission data according to an interfacing scheme with respect to the transmission MODEM 402. The MAC layer 400 also receives data from the reception MODEM 410, processes the received data according to an interfacing scheme with respect to the upper layer, and provides the processed data to the upper layer.

According to an exemplary embodiment of the present invention, the MAC layer 400 provides information required for self-configuration to the self-configuration controller 416. An exemplary embodiment of the present invention pertains to a transmit power setting among self-configuration functions. For setting a transmit power, the signal strengths of neighbor BSs (compact BSs and external BSs) reported by MSs are needed. The MAC layer 400 extracts the signal strengths of the neighbor BSs from messages (e.g. scan report messages) received from MSs and provides the signal strengths to the self-configuration controller 416. The signal strengths can be RSSIs, Signal-to-Interference and Noise Ratios (SINRs), Signal-to-Noise Ratios (SNRs), Carrier-to-Interference and Noise Ratios (CINRs), or the like. The signal strengths are RSSIs herein, by way of example.

The transmission MODEM 402 encodes a packet (a data burst) received from the MAC layer 400 in a physical layer. The transmission MODEM 402 can include a channel encoder, an interleaver, a modulator, and an Inverse Fast Fourier Transform (IFFT) processor.

The RF transmitter 404, which includes a frequency converter, a filter, and an amplifier, converts baseband data received from the transmission MODEM 402 into an analog signal and upconverts the baseband analog signal into an RF signal. The RF transmitter 404 also adjusts the transmit power according to a control signal (a transmit power control signal) received from the self-configuration controller 416.

The duplexer 406 provides a signal received through an antenna to the RF receiver 408 and passes the transmission signal received from the RF transmitter to the antenna by duplexing.

The RF receiver 408, which includes an amplifier, a frequency converter, and a filter, downconverts an RF signal received from the duplexer 406 into a baseband signal and converts the analog baseband signal into digital data.

The reception MODEM 410 decodes the data received from the RF receiver in a physical layer. The reception MODEM 410 may have a Fast Fourier Transform (FFT) processor, a demodulator, a deinterleaver, and a channel decoder. The reception MODEM 410 further includes a signal strength measurer 412 for measuring RSSIs and a noise measurer 414 for measuring a thermal noise.

The signal strength measurer 412 measures the signal strengths of neighbor BSs including external BSs in an MS mode (OTAR mode) and provides them to the self-configuration controller 416. The noise measurer 414 measures a thermal noise in an MS mode and provides it to the self-configuration controller 416.

The self-configuration controller 416 functions to optimize operational parameters required for operations of the compact BS. For example, the operational parameters can include an Frequency Assignment (FA), a segment ID, a cell ID, a transmit power, etc. In exemplary embodiments of the present invention, it is intended to set a transmit power.

In accordance with the first exemplary embodiment of the present invention, a transmit power control can be performed as follows.

To scan neighbor BSs, the self-configuration controller 416 operates the compact BS in the MS mode (OTAR mode). While operating in the MS mode, the signal strength measurer 412 measures the signal strengths of neighbor BSs and provides them to the self-configuration controller 416 and the noise measurer 414 measures a thermal noise and provides it to the self-configuration controller 416. Then the self-configuration controller 416 selects the highest of the signal strengths and the thermal noise and sets a target RSSI by adding the highest value to a power rise. The power rise is an empirically optimized value that ensures the cell coverage of the compact BS, achieved by simulations.

After setting the target RSSI, the self-configuration controller 416 transitions the compact BS to a normal BS mode. While operating in the normal BS mode, the compact BS transmits a scan indication message (e.g. MOB_SCN-RSP) message to MSs, requesting scanning and receives scan report messages (e.g. MOB_SCN-REQ) including scanning results from the MSs. That is, the MAC layer 400 extracts the signal strengths of neighbor BSs measured by the MSs by analyzing the scan report messages and provides the RSSIs of the neighbor BSs to the self-configuration controller 416. The self-configuration controller 416 selects the highest of the signal strengths of neighbor BSs reported by at least one MS and sets the highest value as a maximum RSSI.

The self-configuration controller 416 decides whether to increase or decrease the transmit power by comparing the target RSSI with the maximum RSSI and provides a control signal corresponding to the determined transmit power to the transmission MODEM 402 or the RF transmitter 404. If the maximum RSSI is larger than the target RSSI, which means that the cell coverage area is too large, the transmit power is decreased. If the target RSSI is larger than the maximum RSSI, which means that the coverage area of the compact BS should be increased, the transmit power is increased.

In accordance with the second exemplary embodiment of the present invention, a transmit power control is performed as follows.

The self-configuration controller 416 operates the compact BS in the MS mode (i.e. OTAR mode) to scan external BSs. While operating in the MS mode, the signal strength measurer 412 measures the signal strengths of the external BSs and provides them to the self-configuration controller 416 and the noise measurer 414 measures a thermal noise and provides it to the self-configuration controller 416. The self-configuration controller 416 selects an external BS $j_0$ with the highest signal strength.

The, self-configuration controller 416 transitions the compact BS to a normal BS mode. While operating in the normal BS mode, the compact BS transmits a scan indication message (e.g. MOB_SCN-RSP) to MSs and receives scan report messages (e.g. MOB_SCN-REQ) including scanning results from the MSs. Thus, the self-configuration controller 416 can acquire the scanning results of the compact BS and the external BS $j_0$ (RSSIs).

The self-configuration controller 416 calculates the dB average (first average) of the RSSIs of the compact BS reported by the MSs and calculates the dB average (second average) of the RSSIs of the external BS reported by the MSs. The self-configuration controller 416 estimates shadowing at the location of the compact BS using the second average and computes the sum (I) of interference signals using the RSSIs of the external BSs measured in the OTAR mode and the shadowing estimates. Then, the self-configuration controller 416 calculates the sum NI of the interference sum I and the thermal noise N measured in the OTAR mode. The self-configuration controller 416 calculates a power rise by subtracting the sum NI from the first average.

The self-configuration controller 416 decides whether to increase or decrease the transmit power by comparing a target power rise with the power rise and provides a control signal corresponding to the determined transmit power to the transmission MODEM 402 or the RF transmitter 404. If the power rise is larger than the target power rise, which means that the cell coverage area is too large, the transmit power is decreased. If the target power rise is larger than the power rise, which means that the coverage area of the compact BS should be increased, the transmit power is increased.

As is apparent from the above description of exemplary embodiments of the present invention, a compact BS can optimize its transmit power adaptively according to the states of external BSs. Also, since the transmit power is adjusted based on the signal strengths of neighbor BSs reported by MSs, exemplary embodiments of the present invention are easily implemented. That is, the implementation of exemplary embodiments of the present invention needs no modification to the external BSs. Because the MSs simply report the signal strengths of neighbor BSs to the compact BS in compliance with a communications standard, exemplary embodiments of the present invention can be easily realized without any modification to a conventional system.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A compact Base Station (BS) in a wireless communication system, comprising:
    a measurer for measuring a first signal strength while operating in a Mobile Station (MS) mode, the first signal strength corresponding to strengths of signals received from each of one or more neighbor BSs;
    a receiver for receiving a second signal strength received from one or more MSs, the second signal strength corresponding to strengths of signals from each of the one or more neighbor BSs measured by the one or more MSs; and
    a self-configuration controller for setting a target signal strength based on the first signal strength, for comparing the second signal strength with the target signal strength, and for controlling a transmit power of the compact BS based on the comparison result so that the second signal strength substantially reaches the target signal strength.

2. The compact BS of claim 1, wherein the self-configuration controller sets the target signal strength by adding a set value to a highest signal strength of the first signal strength, sets a highest signal strength of the second signal strength as a maximum signal strength, and controls the transmit power by comparing the maximum signal strength with the target signal strength.

3. The compact BS of claim 2, wherein the self-configuration controller decreases the transmit power, if the maximum signal strength is larger than the target signal strength and increases the transmit power, if the target signal strength is larger than the maximum signal strength.

4. The compact BS of claim 2, wherein the self-configuration controller controls the transmit power when the difference between the maximum signal strength and the target signal strength is equal to or greater than a preset margin.

5. The compact BS of claim 1, wherein the first signal strength or the second signal strength comprises at least one of a Received Signal Strength Indicators (RSSI), a Carrier-to-Interference and Noise Ratio (CINR), a Signal-to-Interference and Noise Ratio (SINR), and a Signal-to-Noise Ratios (SNR).

6. The compact BS of claim 1, further comprising a transmitter for transmitting a neighbor BS scan indication message to the one or more MSs.

7. The compact BS of claim 1, further comprising a noise measurer for measuring a thermal noise while operating in the MS mode.

8. The compact BS of claim 7, wherein the self-configuration controller selects a highest signal strength of the first signal strength and the measured thermal noise and sets the target signal strength by adding the set value to the selected highest value.

9. The compact BS of claim 1, wherein the MS mode is performed every preset period or is triggered by an event.

10. A method for setting a transmit power in a compact Base Station (BS) in a wireless communication system, the method comprising:
    measuring a first signal strength while operating in a Mobile Station (MS) mode, the first signal strength corresponding to strengths of signals received from each of one or more neighbor BSs;
    receiving a second signal strength received from one or more MSs the second signal strength corresponding to strengths of signals from each of the one or more neighbor BSs measured by the one or more MSs, after transitioning to a normal mode;
    setting a target signal strength based on the first signal strength;
    comparing the second signal strength with the target signal strength; and
    controlling a transmit power of the compact BS based on the comparison result so that the second signal strength substantially reaches the target signal strength.

11. The method of claim 10, wherein the setting of the target signal comprises:
    selecting a highest signal strength of the first signal strength; and
    setting the target signal strength by adding a set value to the selected highest signal strength.

12. The method of claim 11, wherein the controlling of the transmit power comprises:
    setting a highest signal strength of the second signal strength as a maximum signal strength; and
    controlling the transmit power by comparing the maximum signal strength with the target signal strength.

13. The method of claim 12, wherein the controlling of the transmit power comprises:
    decreasing the transmit power, if the maximum signal strength is larger than the target signal strength; and
    increasing the transmit power, if the target signal strength is larger than the maximum signal strength.

14. The method of claim 12, wherein the controlling of the transmit power comprises controlling the transmit power when the difference between the maximum signal strength and the target signal strength is equal to or greater than a preset margin.

15. The method of claim 10, wherein the first signal strength or second signal strength comprises at least one of a Received Signal Strength Indicators (RSSI), a Carrier-to-Interference and Noise Ratio (CINR), a Signal-to-Interference and Noise Ratio (SINR), and a Signal-to-Noise Ratios (SNR).

16. The method of claim 10, further comprising measuring a thermal noise while operating in the MS mode.

17. The method of claim 16, wherein the setting of the target signal strength comprises:
    selecting a highest signal strength of the first signal strength and the measured thermal noise; and
    setting the target signal strength by adding the set value to the selected highest value.

18. The method of claim 10, further comprising transmitting a neighbor BS scan indication message to the one or more MSs.

19. A compact Base Station (BS) in a wireless communication system, comprising:
    a measurer for measuring a first signal strength and a thermal noise while operating in a Mobile Station (MS) mode, the first signal strength corresponding to strengths of signals received from each of one or more neighbor BSs;
    a receiver for receiving a second signal strength and a third signal strength received from one or more MSs, the third signal strength corresponding to strengths of signals from the compact BS measured by one or more MSs and the second signal strength corresponding to strengths of signals from the one or more BSs measured by one or more MSs; and
    a self-configuration controller for calculating a first average by averaging the third signal strength, calculating a second average corresponding to an average noise of the one or more MSs based on the first signal strength and the thermal noise, for determining a difference between the first and second averages to be a power rise, for comparing the power rise with a target power rise, and for controlling the transmit power of the compact BS based on the comparison result, such that the power rise substantially reaches a target power rise.

20. The compact BS of claim 19, wherein the self-configuration controller calculates the first average by averaging the third signal strength received from each of the one or more MSs, in dBs.

21. The compact BS of claim 19, wherein the self-configuration controller estimates a shadowing at a location of the compact BS, compensates for the estimated shadowing in the first signal strength, and calculates the second average by adding the thermal noise and the shadowing-compensated signal strengths.

22. The compact BS of claim 21, wherein the self-configuration controller compensates for the shadowing by subtracting the estimated shadowing in dB from each signal strength of the first signal strength in dB.

23. The compact BS of claim 21, wherein the self-configuration controller calculates an average signal strength corresponding to the BS that affects the compact BS the most among the second signal strength and estimates the shadowing by subtracting the average from the signal strength of the BS that affects the compact BS the most, measured in the MS mode.

24. The compact BS of claim 23, wherein the self-configuration controller calculates the average by dB-averaging the signal strength of the BS that affects the compact BS the most among the second signal strength.

25. The compact BS of claim 19, wherein the self-configuration controller decreases the transmit power, if the power rise is larger than the target power rise, and increases the transmit power, if the power rise is less than the target power rise.

26. The compact BS of claim 19, wherein the first signal strength, the second signal strength, or the third signal strength comprises at least one of a Received Signal Strength Indicators (RSSI), a Carrier-to-Interference and Noise Ratio (CINR), a Signal-to-Interference and Noise Ratio (SINR), and a Signal-to-Noise Ratios (SNR).

27. An operation method in a compact Base Station (BS) in a wireless communication system, the method comprising:
    measuring a first signal strength and a thermal noise while operating in Mobile Station (MS) mode, the first signal strength corresponding to strengths of signals received from each of one or more neighbor BSs;
    receiving a second signal strength and a third signal strength received from one or more MSs, the third signal strength corresponding to strengths of signals from the compact BS measured by one or more MSs and the second signal strength corresponding to strengths of signals from the one or more BSs measured by one or more MSs;
    calculating a first average by averaging the third signal strength;
    calculating a second average corresponding to an average noise of the one or more MSs based on the first signal strength and the thermal noise;
    determining a difference between the first and second averages to be a power rise;
    comparing the power rise with a target power rise; and
    controlling a transmit power of the compact BS based on the comparison result, such that the power rise substantially reaches a target power rise.

28. The operation method of claim 27, wherein the calculating of the first average comprises calculating the first average by dB-averaging the signal strength of a BS that affects the compact BS the most among the second signal strength.

29. The operation method of claim 27, wherein the calculating of the second average comprises:
    estimating a shadowing at a location of the compact BS;
    compensating for the estimated shadowing in the first signal strength; and
    calculating the second average by adding the thermal noise and the shadowing-compensated signal strengths.

30. The operation method of claim 29, wherein the estimating of the shadowing comprises:
    calculating an average of the signal strength of the BS that affects the compact BS the most among the second signal strength; and
    estimating the shadowing by subtracting the average from the signal strength of the BS that affects the compact BS the most, measured in the MS mode.

31. The operation method of claim 30, wherein the average is a dB average.

32. The operation method of claim 29, wherein the compensating for the estimated shadowing comprises compensating the averaging by subtracting the estimated shadowing in dB from each signal strength of the first signal strengths in dB.

33. The operation method of claim 27, wherein the controlling of the transmit power comprises:
    decreasing the transmit power, if the power rise is larger than the target power rise; and
    increasing the transmit power, if the power rise is less than the target power rise.

34. The operation method of claim 27, wherein the first signal strength, the second signal strength, or the third signal strength comprises at least one of a Received Signal Strength Indicators (RSSI), a Carrier-to-Interference and Noise Ratio (CINR), a Signal-to-Interference and Noise Ratio (SINR), and a Signal-to-Noise Ratios (SNR).

\* \* \* \* \*